Sept. 10, 1963 L. P. BERNARD 3,103,269
FLUID IMMERSED CLUTCH MECHANISM HAVING AN EXTERNALLY
POSITIONED CONTROLLING ELECTROMAGNET
Filed Oct. 12, 1960 4 Sheets-Sheet 2

Sept. 10, 1963 L. P. BERNARD 3,103,269
FLUID IMMERSED CLUTCH MECHANISM HAVING AN EXTERNALLY
POSITIONED CONTROLLING ELECTROMAGNET
Filed Oct. 12, 1960 4 Sheets-Sheet 3

United States Patent Office 3,103,269
Patented Sept. 10, 1963

3,103,269
FLUID IMMERSED CLUTCH MECHANISM HAVING AN EXTERNALLY POSITIONED CONTROLLING ELECTROMAGNET
Levio P. Bernard, Vestal, N.Y., assignor to International Business Machines Corporation, New York, N.Y., a corporation of New York
Filed Oct. 12, 1960, Ser. No. 62,262
15 Claims. (Cl. 192—28)

This invention relates to clutch apparatus and, more particularly, to apparatus for mounting the control shaft for a fluid immersed clutch mechanism having an externally positioned controlling electromagnet.

The fluid immersed clutch is adapted to operate within a fluid reservoir at very high speeds. The high speed clutch mechanism is controlled by an electromagnet. The speed of operation of the clutch mechanism would be reduced if the electromagnet controlling the same were required to be mounted within the fluid reservoir containing the clutch mechanism. By mounting the controlling electromagnet externally of the fluid reservoir, the armature of the control magnet is able to operate unopposed by fluid and therefore at higher speeds. However, under these conditions, it is necessary to provide against the escape of fluid from the reservoir and for means for absorbing the impact forces placed upon the control shaft.

Accordingly, the prime object of the invention is to provide an arrangement of apparatus for mounting the control shaft for a clutch mechanism disposed within a fluid reservoir and controlled by an electromagnet mounted externally of the reservoir.

A more specific object of the invention is to provide a mounting for a control shaft for a clutch mechanism disposed in a fluid reservoir which prevents escape of fluid from the reservoir.

Still another specific object of the invention is to provide mounting means for a control shaft for a clutch mechanism disposed within a fluid reservoir which absorbs impact forces imposed upon the control shaft.

The foregoing and other objects, features and advantages of the invention will be apparent from the following more particular description of a preferred embodiment of the invention, as illustrated in the companying drawings.

Figure 1:
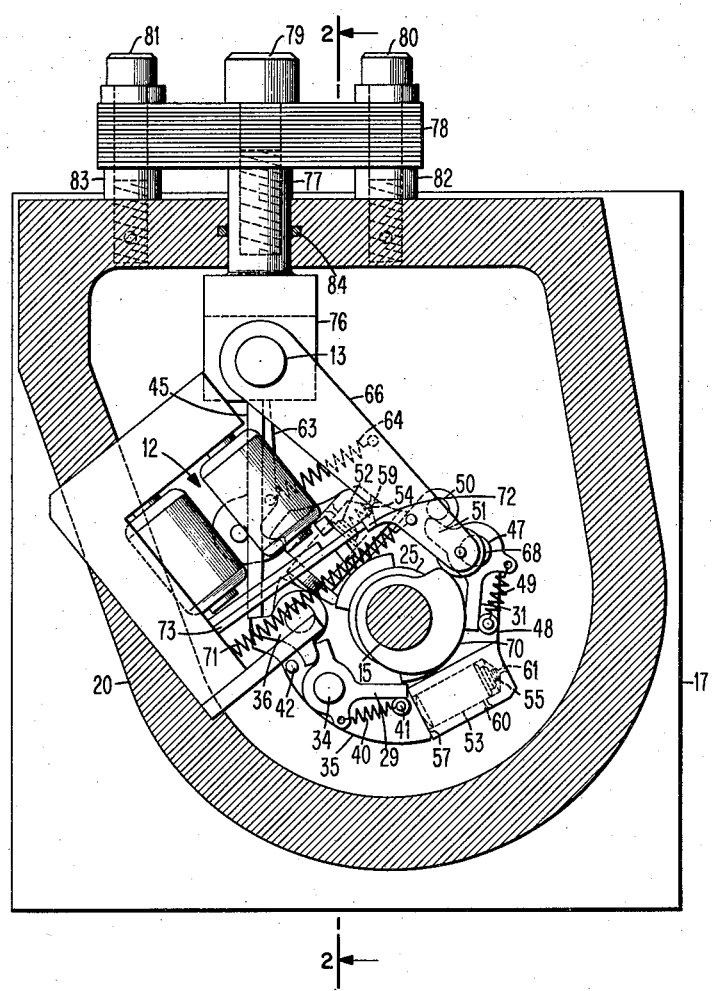
FIG. 1 is a left end elevational view of the invention with parts thereof shown in section.
Figure 2:
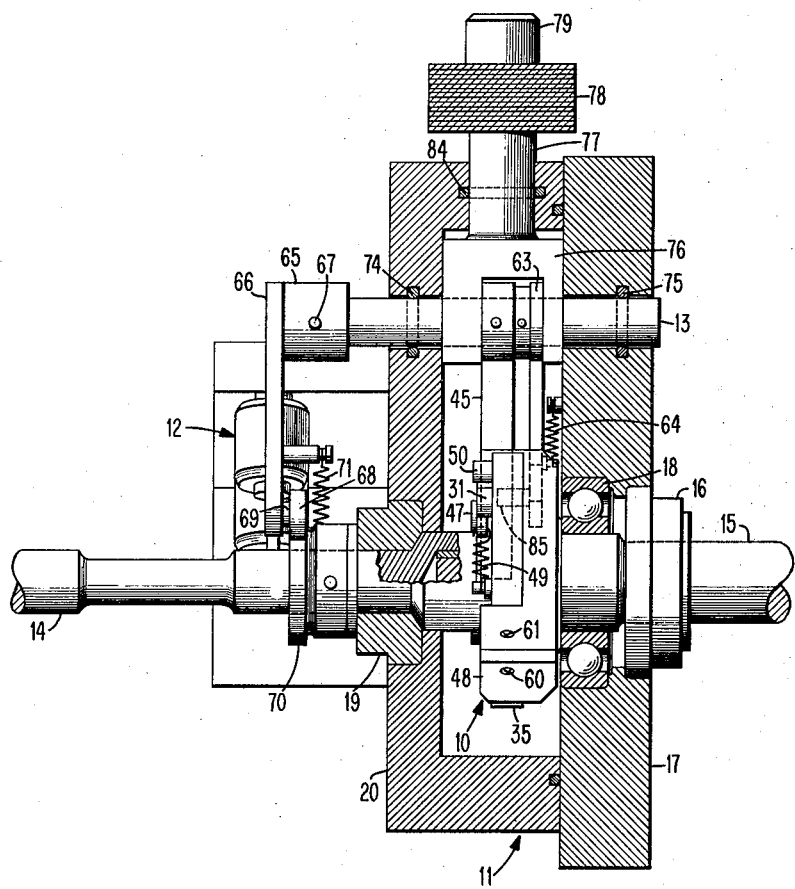
FIG. 2 is a sectional view taken along lines 2—2 in FIG. 1.

Referring to the drawings and particularly to FIGS. 1 and 2, the invention is illustrated by way of example as a clutch 10 positioned within a fluid reservoir 11 and controlled by electromagnet 12 through control shaft 13.

Clutch 10 is adapted to establish a driving relationship between input drive shaft 14 and output load shaft 15. Output shaft 15, FIG. 2, extends through a seal 16 fitted in an aperture of wall 17 of the fluid reservoir 11. The wall 17 also receives the outer race of a rolling element type bearing assembly 18, the inner race thereof embracing the output shaft 15. A reduced portion of the output shaft 15 extends into an enlarged portion of input shaft 14, which is thus journaled by the output shaft 15. A seal 19 fitted in U-shaped wall 20 of fluid reservoir 11 prevents the escape of fluid from the reservoir 11 around the input shaft 14, as seen in FIG. 2. U-shaped wall 20 is fastened to wall 17, by suitable fastening means, not shown, to provide an interior portion for containing fluid and clutch 10.

Figure 3:
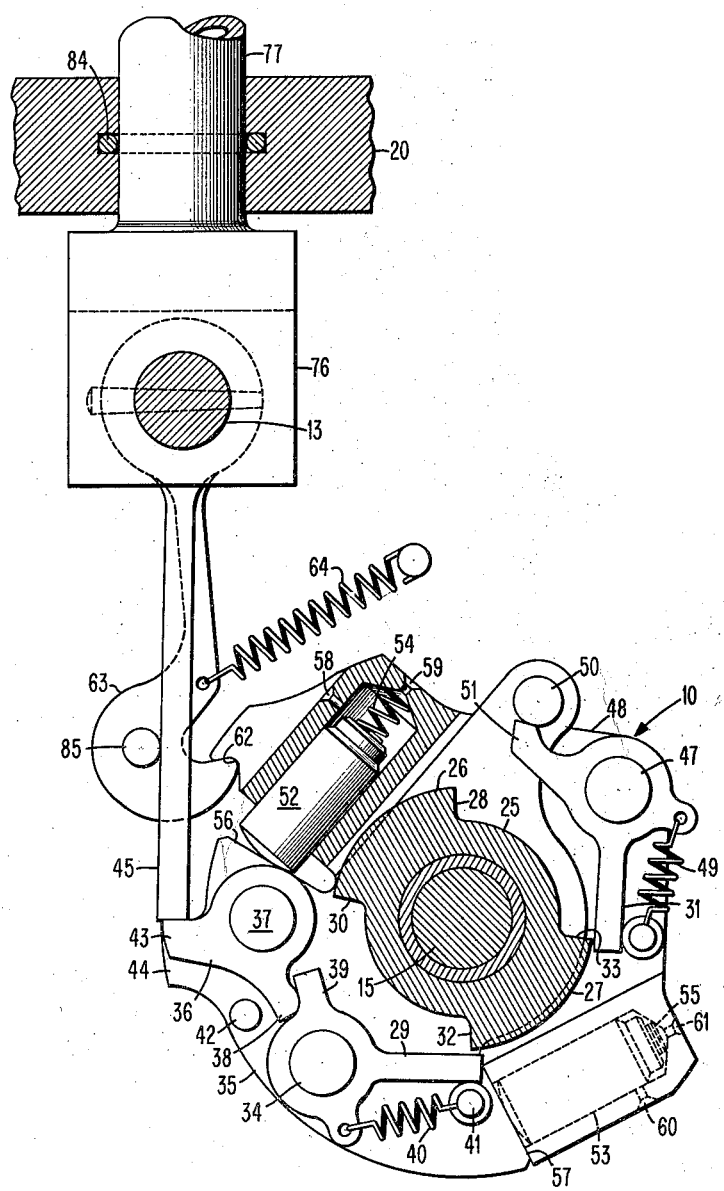
FIG. 3 is a detail view showing the end of the latch on the control shaft being engaged with one of the clutch members; and, FIG. 4 is a detail view similar to that shown in FIG. 3 but with the latch on the control shaft being disengaged.
Figure 4:
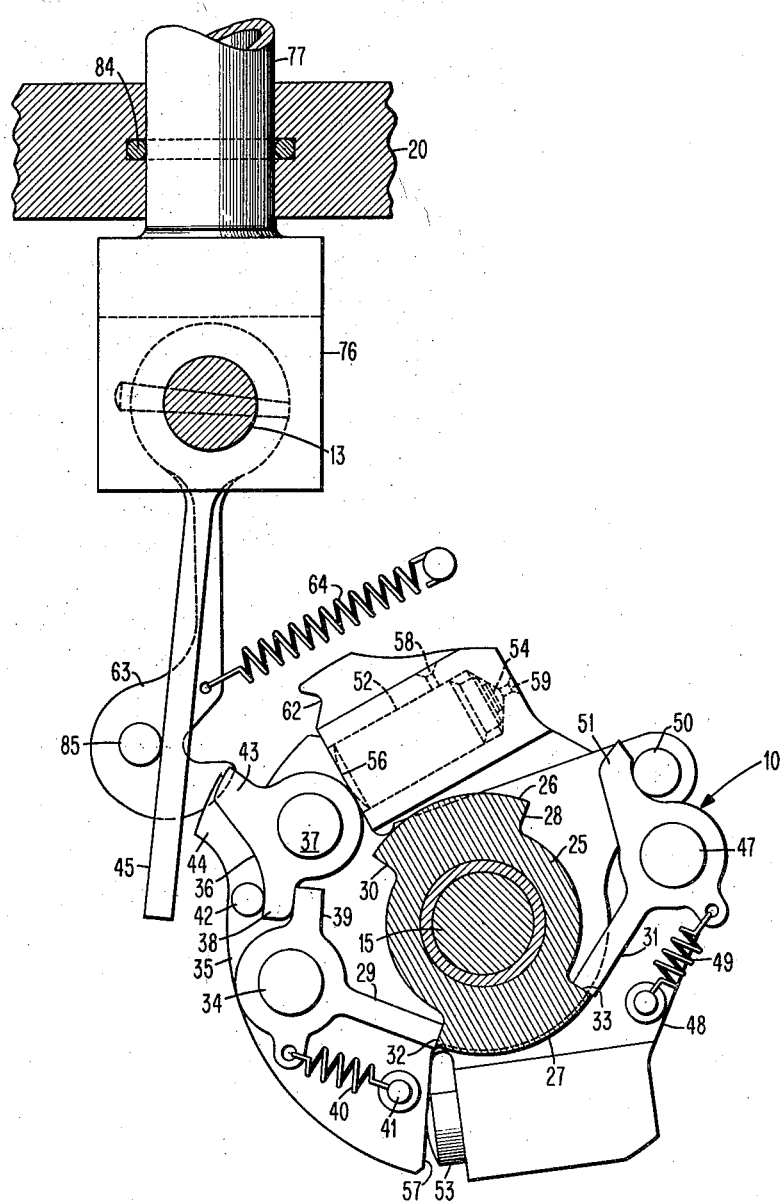

The clutch 10 is a positive type of clutch having acceleration and deceleration control. Clutch 10, FIGS. 3 and 4, includes a driver 25 fixed at and integral with the end of the input shaft 14, residing in the reservoir 11, as seen in FIGS. 1 and 2. Driver 25, FIGS. 3 and 4, is provided with a pair of oppositely disposed projecting members 26 and 27. The projecting member 26 provides a surface 28 for engaging in abutting relationship the end of the pivotally mounted drive pawl 29 and a surface 30 which is adapted to be engaged by the end of a pivotally mounted detent pawl 31. The projecting member 27 is provided with surfaces 32 and 33 adapted to be engaged by the ends of drive pawl 29 and detent pawl 31, respectively.

It is seen that surfaces 28 and 30 are 180° out of phase with surfaces 32 and 33. As it will be seen later herein, the drive pawl 29 and detent pawl 31 are adapted to engage either pair of surfaces.

The drive pawl 29 is pivotally mounted upon a stud 34 projecting from a low inertia intermediate driving member 35. Drive pawl 29 is either held out of engagement with driver 25 or is permitted to come into engagement with surfaces 28 or 32 of driver 25 by means of an operating member 36 pivotally mounted on a stud 37 projecting from the intermediate driving member 35. The operating member 36 is provided with an arm 38 adapted to be in constant engagement with tail 39 of drive pawl 29. This relationship between arm 38 and tail 39 is maintained by a spring 40 and a stop pin 42 projecting from the intermediate driving member 35. The spring 40 is attached at one end to a drive pawl 29 and at its other end to a pin 41 projecting from intermediate driving member 35. The operating member 36 is also provided with an arm 43 which, together with a projection 44 on intermediate driving member 35, are adapted to come into engagement with the end of a latch 45 pinned to control shaft 13.

It is thus seen that the drive pawl 29 functions to establish a drive connection between the input shaft 14 and intermediate driving member 35. The latch 45 controls the movement of drive pawl 29 through operating member 36. The control shaft 13 controls the latch 45 and is controlled by the control magnet 12.

Detent pawl 31 is pivotally mounted by means of a stud 47 fixed to project from a load member 48 secured to the output shaft 15. Detent pawl 31 is urged by means of a spring 49 to engage surfaces 30 or 33 of driver 25. However, a stud 50 projecting from intermediate driving member 35 prevents spring 49 from urging detent pawl 31 to seat upon surface 30 or 33 when the intermediate driving member 35 and load member 48 have relative positions as shown in FIG. 3. Under these conditions, a tail 51 of detent pawl 31 engages the pin 50. The detent pawl 31, thus, functions to latch the load to the drive through the load member 48 and intermediate driving member 35.

Since the intermediate driving member 35 is of low inertia, it can be engaged with and disengaged from the driver 25 under impact. However, the load is of high inertia and it should be smoothly accelerated and decelerated so as to reduce damaging impact forces. The load is accelerated and decelerated by the intermediate driving member 35 through the load member 48.

The load member 48 is bored to receive an accelerating piston 52 and a decelerating piston 53. The crowns of pistons 52 and 53 are urged by springs 54 and 55 to abut against surfaces 56 and 57 on intermediate driving member 35, respectively. Fluid in reservoir 11 is forced by piston 52, when the same is displaced to compress spring 54, through orifices 58 and 59 formed in load member 48. Similarly, decelerating piston 53, in moving to compress spring 55, forces fluid through orifices 60 and 61. The orifices provide a restrictive path to fluid flow to develop accelerating and decelerating forces.

In order to detent the load, the load member 48 is provided with a V-shaped notch 62 adapted to receive a hook-shaped end of a keeper 63 journaled on control shaft 13 in juxtaposition to latch 45. The hook-shaped end of keeper 63 is urged into notch 62 in load member 48 by means of a spring 64. Latch 45 bears against pawl operating arm 43 and projection 44 on intermediate driving member 35 to hold the same against clockwise rotation and against the load member 48, as shown in FIG. 3. Load member 48 is thereby held against keeper 63 which prevents counterclockwise rotation thereof.

Control shaft 13, FIG. 2, is supported in walls 17 and 20 of reservoir 11 and projects from wall 20 into a hub 65 fixed to project from one end of an arm 66. The hub 65 is secured to control shaft 13 by any suitable means, such as set screw 67. A cam follower 68 is journaled on a pin 69 projecting from the other end of arm 66 and is disposed to follow the contour of cam 70, which is fixed to input shaft 14, as seen in FIGS. 1 and 2. The cam 70 is shown as a single-lobe cam; hence, drive pawl 29 and detent pawl 31 always engage the same pair of surfaces; i.e., either surfaces 28 and 30 or 32 and 33. Cam 70 could be provided with double lobes so that drive pawl 29 and detent pawl 31 first engage one pair of surfaces and then the other pair of surfaces. The cam follower 68 is urged into contact with the contour of cam 70 by means of a spring 71. However, cam follower 68 can follow the entire contour of cam 70 only if permitted to do so by control magnet 12. The arm 66 is provided with a lateral projection 72, FIG. 1, which abuts against the end of armature 73 when control magnet 12 is de-energized and the cam follower 68 is on the high portion of cam 70. Under these conditions, the spring 71 is unable to bring the cam follower 68 into contact with the fall of cam 70 as the same rotates. The control shaft 13 is angularly oscillated when the cam follower 68 rides from the high portion down the fall of the cam 70 and back up to the high portion. When the cam follower 68 rides down the fall of the cam 70, the latch 45 is moved away from arm 43 and projection 44. Of course, this only happens if control magnet 12 is energized; otherwise, armature 73 holds arm 66 so that cam follower 68 cannot follow the fall of cam 70.

Fluid in reservoir 11 is prevented from passing around control shaft 13 by means of O ring seals 74 and 75, FIG. 2. The portion of the control shaft 13 within the reservoir 11 passes through a yoke 76 having a stem 77 extending through an opening in wall 20. The yoke 76 is located horizontally and vertically by a stack of plates 78, FIGS. 1 and 2, fixed in spaced relationship relative to reservoir 11. The plates 78 are provided with a central bore to receive a bolt 79 which passes through the plates and threads into stem 77 projecting from yoke 76. The plates 78 are bored near their ends to receive bolts 80 and 81 which pass through spacers 82 and 83, respectively, and thread into the reservoir 11, as seen in FIG. 1. An O ring seal 84 prevents the passage of fluid in reservoir 11 around the extending stem 77 of yoke 76.

As it will be seen later herein, when the operation of the clutch 10 is described, the control shaft 13 has a radial and oscillating angular movement. The stack of shock plates 78 permit some radial displacement of control shaft 13 within clearance holes in walls 17 and 20 and seals 74 and 75 permit this freedom without allowing fluid to escape from the reservoir 11. The friction between the stacked plates 78 helps to damp out the resulting oscillations.

The control shaft 13 is oscillated angularly as cam follower 68 follows the contour of cam 70. This action, of course, can only take place when the armature 73 is attracted by control magnet 12. Assuming the control magnet 12 is energized, the cam follower 68 follows the fall of the cam 70 to move arm 66 which, upon moving, rotates control shaft 13 clockwise. Upon clockwise rotation of control shaft 13, latch 45 is moved out of engagement with arm 43 of operating member 36 and projection 44 of the intermediate driving member 35. Under these conditions, sprng 40 is able to pivot drive pawl 29 into the path of the driver 25. The end of the drive pawl 29 will engage either surface 28 or surface 32 of driver 25, depending upon which surface is in position to engage the end of the drive pawl 29. With the drive pawl 29 engaged with the driver 25, the intermediate driving member 35 is caused to rotate. Rotation of the intermediate driving member 35 forces accelerating piston 52 inwardly relative to the load member 48, thereby compressing spring 54 and forcing fluid through orifices 58 and 59. The resistance to fluid flow by orifices 58 and 59 constitutes the initial accelerating force and starts the load member 48 rotating clockwise. As the velocity difference between the piston 52 and load member 48 is reduced, the accelerating force is also reduced until orifice 58 is closed off by the body of the piston 52. The resulting orifice area reduction builds the acceleration forces approximately to their initial value and their decay reoccurs until the surface 56 on the intermediate driving member 35 contacts load member 48. While this acceleration has taken place, stud 50 has released detent pawl 31 so that spring 49 may pivot detent pawl 31 into contact with either surface 30 or 33 of driver 25. The load is now positively coupled to the input shaft 14. It should be noted that the load member 48 is free to turn as soon as the latch 45 is pivoted by the control shaft 13. When latch 45 is pivoted by the control shaft 13, it carries keeper 63 out of the notch 62 in load member 48. This is accomplished by means of a stud 85 projecting from keeper 63 and engaging latch 45 under action of spring 64.

In addition to the control shaft 13 being angularly oscillated by the cam 70 through the arm 66, impact forces are imposed upon control shaft 13 as arm 43 and projection 44 are driven into latch 45. The impact forces are transmitted through yoke 76 and the stem 77 thereof to the stack of shock plates 78. The yoke 76 is prevented from turning because it is confined between walls 17 and 20 of the reservoir 11.

Latch 45 is moved into the path of the arm 43 and projection 44 by cam 70 as cam follower 68 rides the rise thereof. Normally, cam 70 also acts to move latch 45 out of the path of arm 43 and projection 44 prior to engagement therewith as cam follower 68 rides the fall of the cam 70. However, when control magnet 12 is de-energized, the armature 73 abuts against the projection 72 on arm 66, thereby preventing the arm from moving clockwise to rotate control shaft 13 and move latch 45 out of the path of arm 43 and projection 44.

When latch 45 is in the path of arm 43 and projection 44, the end of the latch 45 strikes the arm 43 first, thereby pivoting operating member 36 about stud 37. As operating member 36 pivots, arm 38 acts upon tail 39 of drive pawl 29 causing the same to pivot about stud 34 and thusly disengage drive pawl 29 from driver 25. With the drive pawl 29 disengaged from the driver 25, the intermediate driving member 35 is immediately arrested by the latch 45 as projection 44 comes into engagement therewith. The load member 48 continues to rotate due to load inertia and deceleration of the load is accomplished by the decelerating piston 53 which is moved relative to the load member 48 so as to compress spring 55 and force fluid through orifices 60 and 61. At the end of deceleration, the load member 48 stops against surface 57 of the intermediate driving member 35. Keeper 63 is then urged by spring 64 into notch 62 of the load member 48 to prevent counterclockwise rebound of the load.

The detent pawl 31 is pivoted out of engagement with driver 25 as stud 50 cams tail 51 counterclockwise about stud 47. The load remains locked to the clutch frame by latch 45, which prevents clockwise rotation, and keeper 63, which prevents counterclockwise rotation.

From the above, it is seen that an arrangement of apparatus has been provided for mounting the control shaft for a clutch mechanism disposed within a fluid reservoir and controlled by an electromagnet mounted externally of the reservoir. Further, apparatus has been provided to absorb the shock imposed upon the control shaft. Provision has also been made to prevent the escape of fluid from the reservoir as the control shaft is angularly oscillated.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Clutch apparatus comprising: a fluid reservoir; a selectively operable clutch having clutch engaging elements contained within said reservoir; an angularly oscillatable control shaft for controlling the operation of said clutch having one portion disposed within said reservoir and another portion projecting therefrom; a control arm carried by said one portion for controlling said clutch; said control arm being positionable from a first position to a second position to permit clutch engaging elements to move to a position for effecting a clutch operation and from said second position to said first position to engage said clutch engaging elements under impact to move the same to a position for effecting a de-clutching operation; an angularly oscillatable arm fixed to said another portion of said control shaft; means for oscillating said angularly oscillatable arm when the same is in operable engagement therewith and magnetic means selectively operable for enabling said angularly oscillatable arm to come into operable engagement with said means for oscillating the same.

2. Clutch apparatus as in claim 1 wherein said means for oscillating said angularly oscillatable arm is a constantly rotating cam.

3. Clutch apparatus as in claim 2 further comprising a fluid seal embracing said control shaft to prevent escape of fluid from said reservoir and permit radial displacement of said control shaft.

4. Clutch apparatus as in claim 3 further comprising shock absorbing means for absorbing forces imposed upon said control shaft by said clutch.

5. Clutch apparatus as in claim 4 wherein said shock absorbing means includes a yoke embracing said one portion of the control shaft within said reservoir, a stem fixed to said yoke and extending therefrom to project from said reservoir, a stack of shock plates attached to the portion of the stem projecting from said reservoir, and means for securing said shock plates relative to said reservoir to permit deflection of said shock plates.

6. Clutch apparatus as in claim 5 further comprising a fluid seal embracing said stem to prevent escape of fluid from said reservoir.

7. Clutch apparatus comprising: a fluid reservoir provided with a plurality of openings; an input shaft extending into said reservoir through one of said openings; an output shaft extending into said reservoir through another of said openings; a selectively operable clutch disposed within said reservoir and attached to said input and said output shafts to selectively couple the input shaft to the output shaft; clutch control means disposed externally of said reservoir; means linking said clutch within said reservoir with said clutch control means disposed externally of said reservoir to connect said clutch under control of said clutch control means, said means for linking said clutch with said clutch control means being under impact by said clutch when said clutch functions to de-couple the output shaft from the input shaft; and means for absorbing the impact forces imposed upon said means for linking said clutch with said clutch control means.

8. Clutch apparatus comprising: a fluid reservoir provided with a plurality of openings; an input shaft extending into said reservoir through one of said openings, an output shaft extending into said reservoir through another of said openings; a selectively operable clutch having clutch engaging elements disposed within said reservoir and attached to said input and output shafts to selectively couple the input shaft to the output shaft; an angularly oscillatable control shaft for controlling the operation of said clutch having one portion disposed within said reservoir and another portion projecting from said reservoir; a control arm carried by said one portion for controlling said clutch, said control arm being positionable from a first position to a second position to permit clutch engaging elements to move to a position for effecting a clutch operation and from said second position to said first position to engage said clutch engaging elements under impact to move the same to a position for effecting a de-clutching operation; control means mounted external to said reservoir for selectively angularly oscillating said control shaft by acting upon said another portion; a yoke embracing said one portion of the control shaft within said reservoir and having a portion extending away from said control shaft to project externally of said reservoir; a stack of shock plates carried by said portion of the yoke extending externally of said reservoir; and means for securing said shock plates relative to said reservoir whereby said shock plates function to absorb the impact forces developed upon said control shaft as said control arm engages said clutch engaging elements under impact.

9. Clutch apparatus as in claim 8 further comprising: a fluid seal embracing said portion of the yoke extending externally of said reservoir to prevent escape of fluid from said reservoir.

10. Clutch apparatus as in claim 8 wherein said control means includes an angularly oscillatable arm fixed to said another portion of said control shaft; means for oscillating said angularly oscillatable arm when the same is in operable engagement therewith, and magnetic means selectively operable for enabling said angularly oscillatable arm to come into operable engagement with said means for oscillating the same.

11. Clutch apparatus as in claim 8 further comprising: a fluid seal embracing said control shaft to prevent escape of fluid from said reservoir and permit radial displacement of said control shaft as said control arm engages said clutch engaging elements under impact.

12. Clutch apparatus as in claim 8 wherein said selectively operable clutch disposed within said reservoir comprises a driver fixed to said input shaft and having separate drive pawl and detent pawl engaging surfaces; an intermediate driving member; a drive pawl pivotally mounted upon said intermediate driving member and normally biased to be urged into engagement with the drive pawl engaging surface of said driver; an operating member pivotally mounted upon said intermediate member so as to normally engage said drive pawl in an operative manner to pivot the same, said operating member being engageable with said control arm and, upon engagement therewith, it is held in a position to hold said drive pawl out of engagement with said driver; and a load member secured to said output shaft, said load member being positionable to be engaged by said intermediate driving member so as to be driven thereby upon said drive pawl engaging said driver.

13. Clutch apparatus as in claim 12 further comprising: a detent pawl pivotally mounted upon said load member and normally urged into engagement with the detent pawl engaging surface of said driver and held out of engagement therewith by said intermediate driving member when the same is at rest.

14. Clutch apparatus as in claim 12 wherein said load member is provided with a plurality of fluid damping pistons relatively movable thereto and positioned therein so as to be operated by said intermediate driving member.

15. Clutch apparatus as in claim 12 further comprising: a keeper fixed to extend radially from said one portion of said control shaft, said keeper normally being urged to engage said load member so as to prevent reverse rotation thereof during a declutching operation.

References Cited in the file of this patent
UNITED STATES PATENTS

| | | |
|---|---|---|
| 2,056,666 | Geldhof | Oct. 6, 1936 |
| 2,368,892 | Skoog | Feb. 6, 1945 |
| 2,607,457 | Keall | Aug. 19, 1952 |
| 2,658,599 | Luhn | Nov. 10, 1953 |
| 2,676,686 | Fletcher | Apr. 27, 1954 |
| 2,853,169 | Usselmann | Sept. 23, 1958 |